C. M. & J. E. MACKENZIE.
FASTENER.
APPLICATION FILED NOV. 22, 1913. RENEWED SEPT. 7, 1918.

1,283,245.

Patented Oct. 29, 1918.

WITNESSES
B. F. Hanway

INVENTORS
Cecilia M. Mackenzie & Jessie E. Mackenzie
BY Mason, Fenwick & Lawrence
ATTORNEYS

UNITED STATES PATENT OFFICE.

CECILIA MARGARET MACKENZIE AND JESSIE EVANGELINE MACKENZIE, OF LONDON, ENGLAND.

FASTENER.

1,283,245.  Specification of Letters Patent.  Patented Oct. 29, 1918.

Application filed November 22, 1913, Serial No. 802,527. Renewed September 7, 1918. Serial No. 253,079.

*To all whom it may concern:*

Be it known that we, CECILIA MARGARET MACKENZIE, a subject of the King of Great Britain and Ireland, and residing at 35 Dover street, in the county of London, England, and JESSIE EVANGELINE MACKENZIE, a subject of the King of Great Britain and Ireland, and residing at 35 Dover street, in the county of London, England, have invented certain new and useful Improvements in and Relating to Fasteners, of which the following is a specification.

This invention relates to spring fasteners especially of the type usually known as glove fasteners or press studs which are largely used for fastening materials or garments of many kinds.

Ordinary press stud fasteners as used in large numbers have the disadvantage that when the garments to which they are applied are tight the fasteners are easily unfastened at the wrong time although the springs are sufficient to retain the fastening when the garments are loose.

Special arrangements of spring studs have been proposed but we have found by experiment that they have disadvantages, either they are intended for loose garments and become undone if subjected to much stress or they can only be applied on garments which keep them in a state of stress, becoming undone if the garments be loose or again difficulty occurs in fastening and unfastening.

According to our invention by which these difficulties are overcome we take a press stud of ordinary form with a central dome through which springs project tending to keep the other part of the stud in the center of the dome and drill or otherwise cut a small hole through the dome at a place in the edge and through the base plate. We find in this way that with loose garments the improved stud acts as an ordinary stud and is used as such, the additional hole having practically no effect; with tight garments or when stresses occur although the stud is fastened and unfastened as an ordinary stud yet the hole catches the head of the other part of the stud and serves to give a secure fastening.

Referring to the accompanying diagrammatic drawings:—

Figure 1:
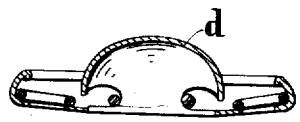
Figure 2:
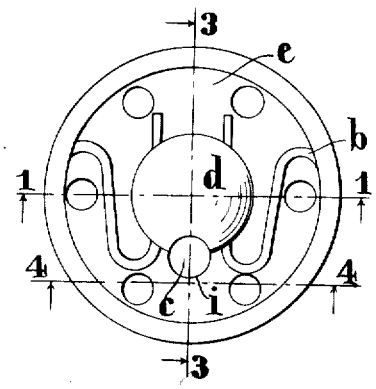

Figure 1 is a section (on the line 1—1 of Fig. 2) of one element of a press stud, and Fig. 2 is a plan corresponding thereto.

Figure 3:
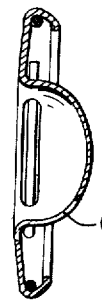
Figure 4:
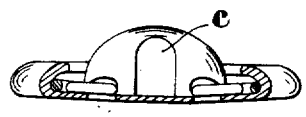

Figs. 3 and 4 are sections on the lines 3—3 and 4—4 of Fig. 2 respectively.

Figure 5:
Figure 6:
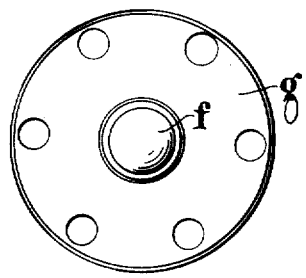

Figs. 5 and 6 show the other element in elevation and plan respectively.

The drawings which illustrate one manner of carrying the invention into effect show a press stud of well known form except that a small hole $c$ is drilled partly through the crown $d$ and partly through the flange $e$. The hole may be of different shape to that shown, it may be formed otherwise than by drilling.

In use the head $f$ of the lower member $g$ is pushed into the crown $d$ past springs $b$ exactly as with the usual fastener.

When stresses occur in the material instead of the fastener being pulled open the head $f$ is drawn into the hole $c$ where it is practically unacted upon by the springs $b$ but where it becomes securely locked because the head $f$ cannot pass through the hole which is made of sufficiently small diameter and the neck $h$ of the head engages with the edge $i$ of the hole. In this way central entry of the head $f$ is obtained and slight motion is permitted after fastening, giving a press stud which is easy to fasten and which does not become unfastened in use.

It will be quite well appreciated that this particular formation is given as an example only and may be modified.

Having now described our invention, what we claim as new and desire to secure by Letters Patent is:—

1. A spring element of a spring press stud with a central dome, spring wires extending therethrough parallel to each other and to a diameter and situate on each side of the aforesaid diameter, the dome being perforated at its edge on the same diameter.

2. A spring element of a spring press stud with a dome and a flange, spring wires extending through the dome parallel to each other and to a diameter and situate on each side of the aforesaid diameter, a small hole being cut in part at the edge of the dome on the same diameter and in part in the flange contiguous thereto.

3. A spring element of a spring press stud with a central dome, a flange and a turned-over rim, a spring wire held in the rim, the two ends extending through the dome parallel to each other and to a diameter and situate on each side of the aforesaid diameter, and a small hole being cut in part through the edge of the dome and in part through the flange adjacent thereto on the same aforesaid diameter.

In testimony whereof we have signed our names to this specification in the presence of two subscribing witnesses.

CECILIA MARGARET MACKENZIE.
JESSIE EVANGELINE MACKENZIE.

Witnesses to the signature of Cecilia M. Mackenzie:
 JOHN G. MACROE,
 G. C. SINCLAIR.

Witnesses to the signature of Jessie E. Mackenzie:
 CARL R. LOOP,
 O. J. WORTH.